Oct. 6, 1953 R. C. EDSON 2,654,804

POWER LINE CARRIER TELEPHONE SYSTEM

Filed May 27, 1949 2 Sheets-Sheet 1

INVENTOR
R.C. EDSON
BY
C. O. Covell
ATTORNEY

POWER LINE CARRIER TELEPHONE SYSTEM

Filed May 27, 1949 2 Sheets-Sheet 2

INVENTOR
R.C. EDSON
BY R. O. Covell
ATTORNEY

Patented Oct. 6, 1953 2,654,804

UNITED STATES PATENT OFFICE 2,654,804

POWER LINE CARRIER TELEPHONE SYSTEM

Robert C. Edson, Livingston, N. J., assignor to Bell Telephone Laboratories, Incorporated, New York, N. Y., a corporation of New York Application May 27, 1949, Serial No. 95,683

4 Claims. (Cl. 179—2.5)

Figure 1:
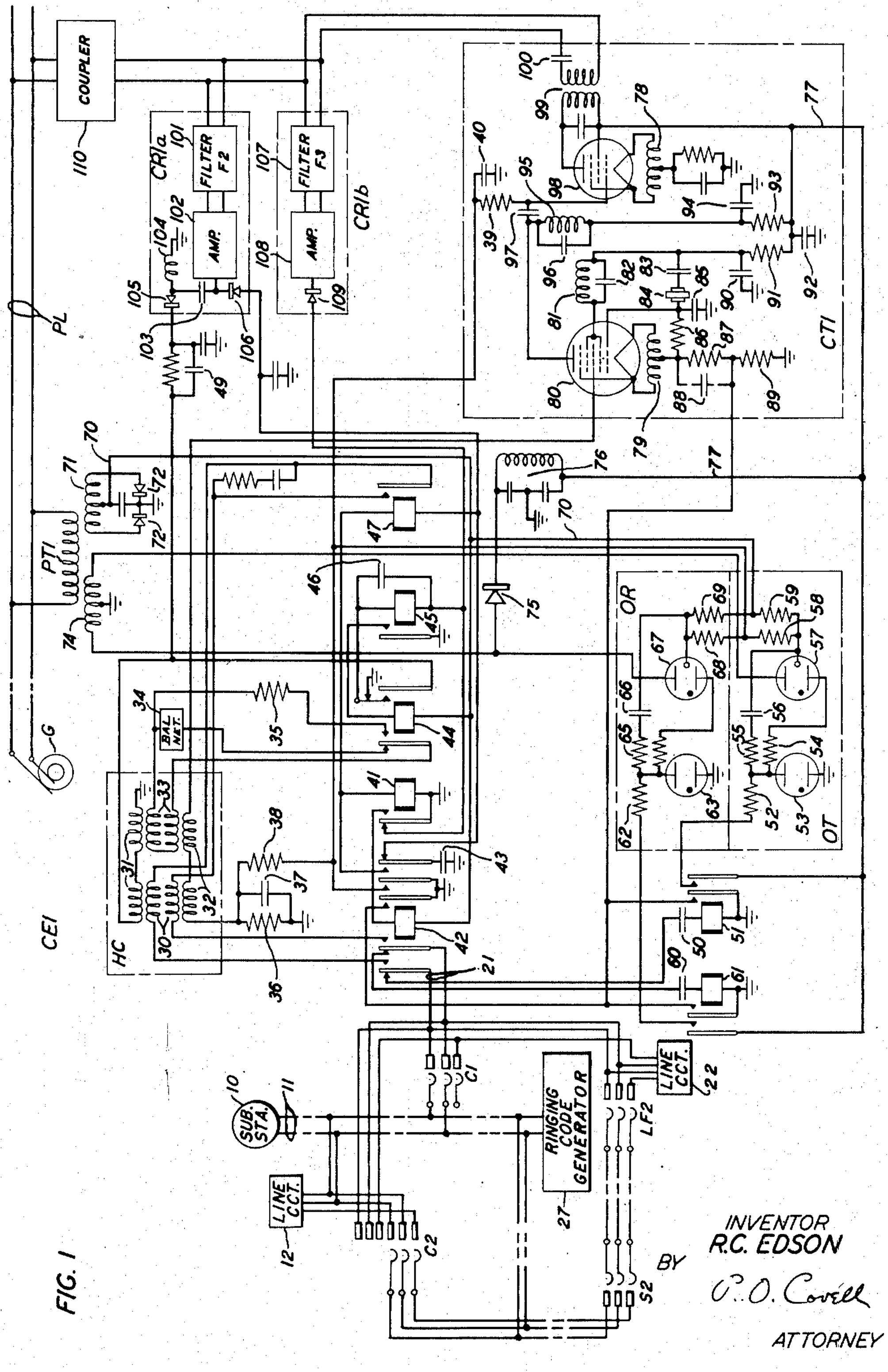

This invention relates to communication systems and particularly to telephone systems which include subscriber stations arranged for carrier current operation over a transmission line, which may be either a power transmission line or a line primarily constructed for communication purposes.

Objects of the invention are the provision of carrier telephone service over transmission lines to both carrier and non-carrier subscriber stations served by the same power line or by interconnected power lines, and the provision of means whereby divided code ringing may be employed for ringing both the carrier and non-carrier stations.

This invention is a telephone system comprising a central office including subscriber lines, a power transmission line and carrier terminal equipment interconnecting one or more of the subscriber lines with the power transmission line; whereby telephone service is provided for both carrier and non-carrier subscribers' stations connected to the power line.

A feature of the invention is a telephone system comprising a power transmission line in which divided code ringing is provided in the central office to signal both carrier and non-carrier stations connected to the power transmission line.

A further feature is a telephone system comprising a carrier current transmission line for giving telephone service to a plurality of subscriber stations, the carrier terminal equipments at the ends of said transmission line being connected to the same power supply and arranged for divided code ringing.

A clear and complete explanation of the invention will be facilitated by a description of the system embodying the invention and its features, one such system employing a power transmission line as a carrier frequency transmission line being shown schematically in the drawings accompanying this specification.

The drawings consist of two figures and schematically represent an automatic telephone exchange having a plurality of subscriber stations connected thereto by a power transmission line.

Figure 2:
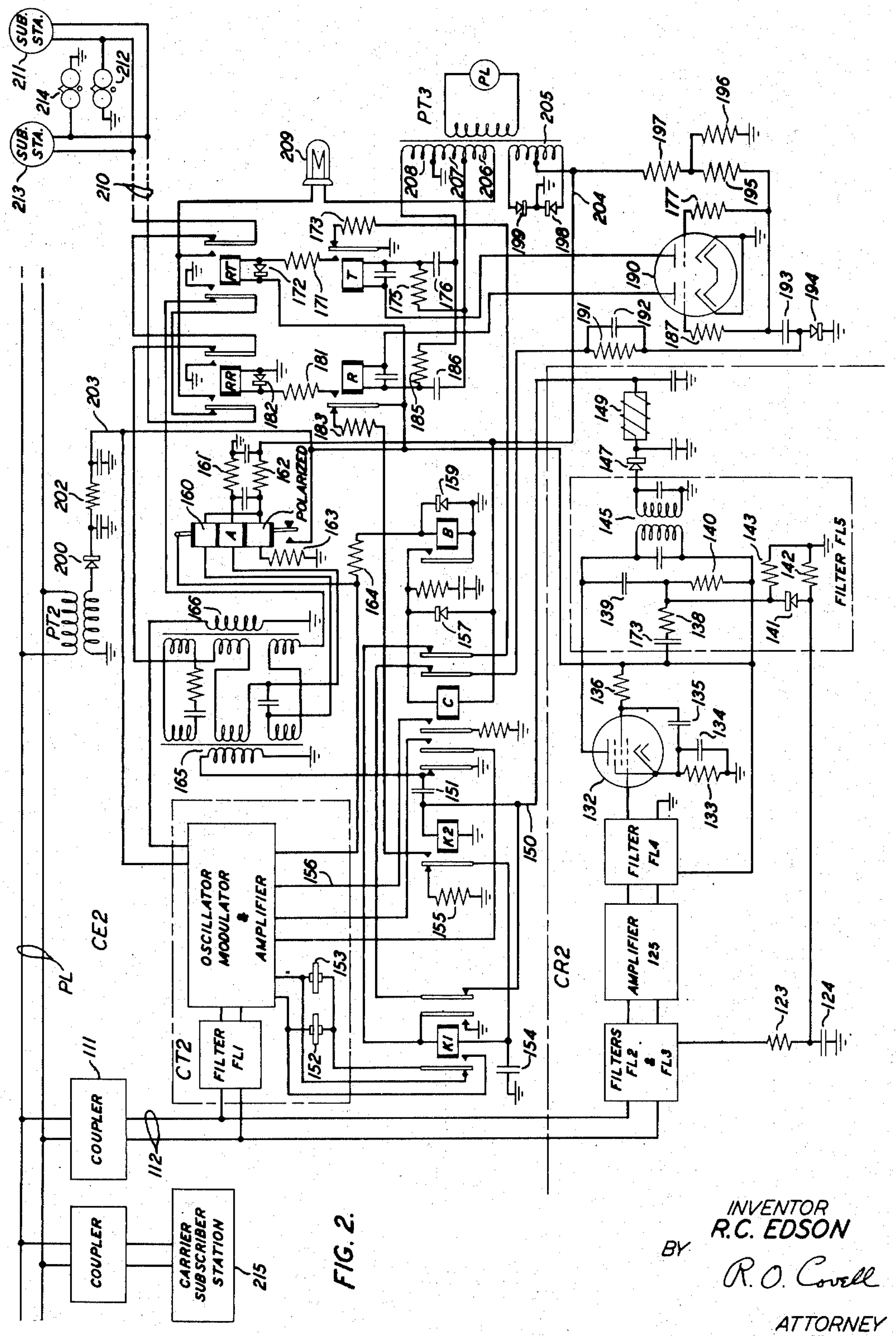

Referring to the drawings:

Fig. 1 shows a dial telephone exchange which is represented by a subscriber's station 10 and line 11, a connector switch C1, a ringing code generator 27, another subscriber line 21, a power transmission line PL, and a carrier terminal equipment CE1 interconnecting the line 21 and power line PL; and Fig. 2 shows a carrier subscriber station 215 connected to the power line PL, and shows carrier terminal equipment CE2 interconnecting the power line PL and a telephone line 210 to which subscribers' stations 211 and 213 are connected.

The subscribers' stations 10, 211 and 213 are of the usual type provided for use on lines terminating in an automatic central office or exchange and each station includes a dial or other impulse sender (not shown) for use in selectively controlling the switches in the central office through which desired connections are established. The station 211 includes a ringer 212 which is connected between one conductor of line 210 and ground; and the station 213 includes a ringer 214 which is connected between the other conductor of line 210 and ground. Other similar stations may be connected to line 210 with ringers connected to the one or the other of the line conductors. Although the line 11 is shown connected directly to a connector switch C1, it is understood that the connection therebetween includes other switches, for instance, a line-finder switch and a first selector switch. The connector C1 is represented by a set of brushes and a single set of terminals, the associated relays and other equipment being omitted. The line-finder, selector and connector switches may be of the step-by-step two-motion type. Reference may be had to Automatic Telephony by Smith and Campbell, 2d edition, pages 53 to 65, inclusive, for a detailed description of the structure of step-by-step switches and their operation when arranged for use as selectors and connectors. Reference may be had to Patent 1,799,654 granted to R. L. Stokely, April 7, 1931, for a detailed disclosure of a subscriber line circuit and a line-finder of the step-by-step type. The ringing code generator 27 is common to all of the connectors in the office and comprises a source of ringing current and means for interrupting the ringing supply conductors to produce a plurality of different ringing codes for selectively signaling subscriber stations. Reference may be had to Patent 2,225,907 granted to J. Duguid, December 24, 1940, for a disclosure of such a ringing code generator and to Patent 2,289,503 granted to C. D. Koechling, July 14, 1942, for a detailed disclosure of a connector switch arranged for ten-party code ringing.

The carrier equipment CE1 shown in Fig. 1 is similar to that shown in Fig. 2 of the patent application Serial No. 692,350 filed August 22, 1946, by R. C. Edson and L. Hochgraf, now Patent 2,516,763 granted July 25, 1950; the carrier subscriber station 215 shown in Fig. 2 is similar to the carrier station shown in Fig. 3 of the Edson-Hochgraf application; and the carrier equipment CE2 shown in Fig. 2 is a modification of the carrier equipment shown in Fig. 3 of the same patent application.

The carrier terminal equipment CE1 comprises a carrier current transmitter CT1, two carrier current receivers CR1a and CR1b, a hybrid coil or group of transformer windings HC arranged to transmit signal and voice currents to and from line 21, ringing relays 51 and 61, two relaxation oscillators OT and OR, relays 41, 42, 44, 45 and 47 and a power transformer PT1 together with other pieces of apparatus including filters, rectifiers, condensers and resistors. The middle left pair of windings 30 of the hybrid coil HC are connected by normally open contacts of a control relay 42 to the conductors of line 21 and the closure of a direct-current circuit through these windings in series with line 21 is under the control of relay 47. The middle right pair of windings 33 are normally connected in series with the balancing network 34 to balance the line 21; and a resistor 35 is provided for connection in place of the balancing network 34 on reverting calls, that is, on calls between stations connected to the same central office subscriber line. The upper pair of windings 31 of the hybrid coil receive voice frequency currents from the carrier receiver CR1*a* and the lower pair of windings 32 of the hybrid coil transmit voice frequency current from line 21 to the carrier transmitter CT1. The carrier receiver CR1*a* comprises a receiving filter 101, tuned to receive voice modulated and signal modulated carrier currents of a frequency F2 over the power line from any of the subscriber telephone stations associated therewith, an amplifier 102 and demodulators 105 and 106. The carrier receiver CR1*b* comprises a receiving filter 107 tuned to receive carrier current of a frequency F3 transmitted over the power line on a reverting call from one of the subscriber stations, an amplifier 108 and a demodulator 109.

The carrier transmitter CT1 comprises an oscillator modulator tube 80 and an amplifier tube 98. The oscillator tube has associated therewith the tuned circuit comprising inductance 81, capacitor 82, and a piezocrystal 84 connected in circuit to generate oscillations at a desired carrier frequency F1. The tuned circuit has a high impedance at frequencies other than that of the crystal 84 so as to prevent oscillations at frequencies other than the desired carrier frequency which is determined by crystal 84. Since voice frequency current from telephone line 21 is transmitted to tube 80 through the lower pair of windings 32 of hybrid coil HC, the output current of tube 80 includes both modulated carrier and voice frequency components. The network consisting of coil 95 and condenser 96 has a high impedance at the carrier frequency and a low impedance at voice frequencies; and element 94 has a low impedance at the carrier frequency and at voice frequencies. The voice modulated carrier frequency output of tube 80 is impressed through condenser 97 on the control grid of amplifier tube 98 and the amplified carrier current is transmitted through transformer 99, condenser 100 and coupler 110 over the power line PL. The energy for operating tubes 80 and 98 and for operating the vacuum tubes of the carrier receivers CR1*a* and CR1*b* is obtained from the power line through the transformer PT1. Other power distribution transformers may interconnect transformer PT1 and the power line. Plate current for the vacuum tubes is supplied through part of winding 74 of transformer PT1, rectifier 75, filter 76 and conductor 77. Winding 74 also supplies alternating voltage to the upper elements of each of tubes 57 and 67 of the relaxation oscillators to control the transmission of ringing signals over the power line to the carrier subscribers' stations as hereinafter further described. Winding 71 of power transformer PT1 in combination with rectifier 72 constitutes a source of negative potential for operating relays 42 and 44 and for biasing the grid of tube 98. The filaments of tubes 80 and 98 are heated by energy transmitted through windings 79 and 78 of power transformer PT1, these windings being shown adjacent the tubes. Other windings of power transformer PT1 supply the current for heating the filaments of vacuum tubes of the carrier receivers CR1*a* and CR1*b*. The carrier receivers are normally energized ready to receive signals but the bias normally provided for tubes 80 and 98 is such that there is normally substantially no current in the plate circuits of these tubes. When the transmission of carrier current of frequency F1 is desired, the operation of one of relays 42, 51 and 61 short-circuits biasing resistor 89 to decrease the negative bias on the grid of tube 80; and the operation of relay 42 or the breakdown of either one of gas-filled tubes 57 and 67 decreases the negative bias of tube 98 to increase the output of the amplifier. The operation of the carrier terminal equipment CE1 of Fig. 1 is hereinafter further described on calls to and from the subscriber stations connected to the power line.

The carrier terminal equipment CE2 shown in Fig. 2 comprises a carrier receiver CR2 and a carrier transmitter CT2 both of which are connected by conductors 112 through a coupler 111 to the power line PL. Energy for the receiver and transmitter is supplied from the power line through transformers PT2 and PT3. Other power distribution transformers may interconnect transformers PT2 and PT3 and the power line. A winding of the power transformer PT2 is connected in series with a rectifier 200 and resistor 202 to conductor 203 which supplies plate current for the carrier transmitter CT2 and carrier receiver CR2. The carrier transmitter CT2 comprises a modulator and amplifier and output filter FL1 and two piezocrystals 152 and 153 connected with the oscillator modulator tube (not shown) to generate carrier current of frequency F2 or frequency F3 as desired, the operative connection of the one or the other of the crystals being controlled by a relay K1. The carrier receiver CR2 comprises filter units FL2 and FL3 which transmit current of carrier frequency F1 and suppress components of other frequencies, an amplifier 125, an interstage filter FL4, an amplifier 132, an output filter FL5 and a demodulator 147. The filters FL2, FL3 and FL4 and amplifier 125 are similar to the like identified elements in the aforementioned Edson-Hochgraf patent application. The carrier terminal equipment further includes relay K2 connected in series with rectifier 147 for operation by incoming carrier current, transformers 165 and 166 for transmitting voice currents between the voice line 210 and the carrier current transmitter CT2 and carrier current receiver CR2, a line relay 160, and a ringing control apparatus which includes relays R, T, RR, and RT, vacuum tube 190, and a number of resistors, condensers and rectifiers. Windings of power transformer PT3 supply ringing voltage for operating the ringers at stations 211, 213; another winding of transformer PT3 together with rectifiers 198 and 199 supplies the current for operating various relays and the control potentials for the grid elements of tube 190; another winding (not shown) supplies the current for the filaments of tube 190.

Assume now that a call is initiated at station 10 and that the called station is one of the stations connected to line 210. The line 11 is extended by the operation of a line-finder switch (not shown) and by the operation of one or more selector switches (not shown) and connector C1 responsive to the dialing of the called station's directory number to select the line 21 which connects to the carrier terminal equipment CE1; and, in response to the dialing of the party identifying digit of the called number, the connector C1 selects the particular ringing code which is to be used to signal station 211. The connector C1 tests the terminals to which line 21 is connected to determine whether or not the line is busy; and, if the line is idle, completes the ringing circuit whereby the required ringing code is transmitted over either the tip or the ring conductor of line 21 to operate the one or the other of ringing relays 51 or 61. The ringing current frequency may be 20 cycles per second and relays 51 and 61 are of a type which is operatively responsive to currents of such a frequency. If the called station is signaled over the tip conductor of line 21, the ringing current effects the operation of relay 51 of the carrier terminal equipment CE1 during each ringing interval of the selected ringing code; and, if the called station is signaled over the ring conductor of line 21, the ringing current effects the operation of relay 61 of the carrier terminal equipment CE1 during each ringing interval of the selected ringing code. The operation of either relay 51 or relay 61, responsive to ringing current transmitted over line 21, closes a short circuit across resistor 89 thereby reducing the grid bias of oscillator tube 80 of carrier transmitter CT1. The operation of relay 51 connects the plate supply conductor 77 to relaxation oscillator OT and the operation of relay 61 connects the plate supply conductor 77 to relaxation oscillator OR. The two relaxation oscillators OT and OR are made up of similar elements and operate in like manner. Assume that relay 51 is operated by the ringing current received over line 21 from connector C1. The operation of relay 51 closes a circuit for charging condenser 56, this circuit being traced from plate supply conductor 77, through a front contact of relay 51, resistors 52 and 55, condenser 56, resistor 59, conductor 70, winding 71 of power transformer PT1 and rectifiers 72 to ground. The charging of condenser 56 builds up a voltage across the control gap of gas-filled tube 57, a predetermined interval of time being required to charge condenser 56 to a voltage sufficient to ionize the control gap of tube 57. As soon thereafter as the winding 74 of power transformer PT1 is energized in a direction which renders the main anode of tube 57 positive with respect to ground potential, a discharge is started between the main anode and cathode of tube 57. The voltage drop through resistor 59 is thus increased so as to reduce the bias applied through resistors 58 and 39 to the grid of tube 98 and to reduce the bias applied through resistor 38 and windings 32 of hybrid coil HC to a grid of tube 80; whereby carrier current of frequency F1 is generated and transmitted through transformer 99 and coupler 110, over the power line to each of the carrier subscriber stations. As the potential of the cathode of tube 57 rises, the voltage applied through condenser 56 and resistor 55 to the gas-filled tube 53 is increased until the discharge occurs in gas-filled tube 53. The potential of the starter anode of tube 57 is reduced due to discharge in tube 53. When the power voltage begins to fall, so also does the potential of the main anode of tube 57; and, when this potential falls to a value which is insufficient to maintain a discharge between the main anode and cathode of tube 57, the discharge in tube 57 ceases, tube 53 is deenergized and the potential applied to the grids of the transmitter tubes 80 and 98 becomes sufficiently negative to terminate the transmission of carrier current of frequency F1 over the power line PL. The voltage between conductors 70 and 77, the capacity of condenser 56, and the resistance of element 55 are such that it takes a predetermined interval of time for the voltage across the control gap of tube 57 to reach the breakdown value. It is the function of tube 53 to stabilize the oscillator OT against variations in the supply voltages to the oscillator obtained from the power line. With tube 53 provided as shown, the voltage from which condenser 56 starts to recharge becomes lower as the supply voltage becomes higher; and the voltage from which condenser 56 starts to recharge becomes higher as the supply voltage becomes lower. The provision of tube 53 thus insures a very nearly constant time for the voltage across the control gap of tube 57 to reach the breakdown value. During the interval which is measured by the charging of condenser 56, the winding 74 of power transformer PT1 will have been energized by a half cycle of opposite polarity and by another half cycle of power wave of the polarity which tends to make the main anode of tube 57 positive with respect to ground; but no impulse of carrier current of frequency F1 is transmitted during this period because at the time the anode of tube 57 becomes positive, the voltage across the control gap has not reached a value sufficient to effect breakdown. During the following half cycle of the power wave, while the main anode of tube 57 is negative with respect to ground, the voltage across condenser 56 increases sufficiently to effect ionization of the control gap; and as soon thereafter as the voltage induced in winding 74 once more makes the main anode of tube 57 sufficiently positive with respect to ground, the main gap of tube 57 is ionized and the transmitter CT1 is energized to transmit another impulse of carrier current of frequency F1. Thus, every second positive half cycle of the power wave effects the breakdown of tube 57 as long as relay 51 remains operated. Thus, assuming the power line frequency to be 60 cycles per second, carrier current impulses of about 7 milliseconds duration are transmitted over the power line during each ringing interval of the ringing code transmitted from connector C1 over line 21 to relay 51, the impulses being transmitted over the power line at a rate of 30 impulses per second.

If ringing current is received over the ring conductor of line 21 instead of the tip conductor, relay 61 is operated instead of relay 51; and oscillator OR is energized in similar manner to that in which oscillator OT is energized as above described. The carrier transmitter CT1 is thereby energized to transmit carrier current impulses of frequency F1 over power line PL at a rate of 30 impulses per second during every second half cycle of the voltage wave induced in winding 74 of power transformer of the polarity opposite to that which effects the operation of oscillator OT. Thus, when relay 51 is operated, half cycles of one polarity of the power wave cause the operation of oscillator OT to send ringing signal impulses of carrier current over power line PL; and when relay 61 is operated, half cycles of the other polarity of the power wave cause the operation of oscillator OR to send ringing signal impulses of carrier current over the power line.

In some cases, the central office may be arranged to transmit ringing current over one conductor of a line to ring the calling station at the same time that ringing current is being transmitted over the other conductor of the line to ring the called station. In such a case, both of relays 51 and 61 are operated at the same time; and carrier current is transmitted during both the positive and negative halves of alternate cycles of the power voltage.

The ringing signal impulses of carrier current of frequency F1, generated by carrier current transmitter CT1 responsive to ringing current transmitted over line 21 from the central office to the carrier equipment CE1, are transmitted over the power line PL to each of the carrier subscriber stations such as 215 and also to the carrier terminal equipment CE2. At the carrier subscriber station, the operations in response to the ringing signal are the same as described in the aforementioned Edson-Hochgraf patent application. The ringing signal carrier current impulses incoming through the coupler 111 to carrier equipment CE2 are transmitted through conductors 112, filter FL2 and FL3 of the carrier receiver CR2, amplifier 125, and filter FL4 to the amplifier 132. The positive potential supply conductor 203 is connected through resistor 136 to the screen grid of tube 132 and is further connected through the left winding of transformer 145 to the anode of tube 132, so that tube 132 is effective to amplify ringing signal carrier current impulses received during both positive and negative half cycles of the power wave. The right winding of transformer 145 is connected in series with rectifier 147, retard coil 149, conductor 150 and the winding of relay K2; whereby relay K2 operates and releases at a 30-cycle rate in response to the rectified impulses of carrier current of frequency F1 whenever ringing current signal impulses of this frequency are received from the power line. Each operation of relay K2 closes a circuit from positive potential supply conductor 203, through a back contact of relay R, resistor 183, front contact of relay K2, winding of relay K1, a back contact of relay C, resistor 173 and a back contact of relay T to ground. The winding of relay K1 is shunted by condenser 154 which charges when relay K2 operates and which discharges through resistor 155 each time relay K2 releases. The capacity of condenser 154 and resistance of element 155 have values required to prevent the operative energization of the winding of relay K1 responsive to the alternate operation and release of relay K2 at the rate of 30 cycles per second. At the same time that relay K2 is operatively responding to the rectified ringing signal impulses, these direct-current impulses are being applied through conductor 150 and back contacts of relays K1 and C, through a transient eliminating network consisting of resistor 191, condensers 192 and 193 and varistor 194, and through resistors 177 and 187 to the grids of the double triode tube 190. The grids of tube 190 are normally negatively biased to cut off thereby making both sections of the tube responsive only to the application of positive voltage to the grid. The biasing circuit is traced from ground through the one or the other of rectifiers 198 and 199 and the associated half of winding 205 of transformer PT3, resistor 197 and resistor 196, whereby the drop across resistor 196 is applied through resistor 195 to the grid of each triode. If the voltage applied through conductor 150 consists of a single transient, resulting from other operating functions, the above network will effectively reduce the positive voltage from this transient to prevent the operation of either of relays T and R. Normally condenser 192 is in a discharged state due to resistor 191. When a transient of positive voltage appears on conductor 150, condenser 192 will be charged through varistor 194 and the voltage at the junction of varistor 194 and condenser 193 will not build up to a value sufficient to make either section of vacuum tube 190 operative. After the transient voltage has ceased, condenser 192 will discharge through resistor 191. However, when the voltage on conductor 150 consists of rectified 30-cycle positive ringing pulses, a charge will build up to remain on condenser 192 due to the time constant of the circuit; and this charge will maintain varistor 194 in a high impedance state so that the 30-cycle positive pulses will be transmitted through condenser 193 and make one or the other of the triodes of tube 190 operative, depending upon which plate element is positive at the same time the corresponding grid has been made less negative by the positive pulse.

The plate of the left-hand triode is connected through the winding of relay R, resistor 185 and winding 208 of transformer PT3; and the plate of the right-hand triode is connected through the winding of relay T, resistor 175 and winding 207 of transformer PT3. Since the voltages induced in windings 207 and 208 are 180 degrees out of phase, the plates of the two triodes will alternately have impressed thereon a positive potential with respect to ground. Assuming that the power line voltage applied to the carrier terminal equipment CE1 is in phase with the power line voltage applied to carrier terminal equipment CE2, positive potential pulses applied to the grids of tube 190 will be synchronized with the positive potentials applied to the plates, so that relay R is operated by breakdown of the left triode of tube 190 when the carrier terminal equipment CE1 transmits ringing signal carrier current impulses responsive to the operation of relay 61; and relay T is operated by breakdown of the right triode of tube 190 when the carrier terminal equipment CE1 transmits ringing signal carrier current impulses responsive to the operation of relay 51. The condensers connected in parallel with the windings of relays T and R delay their operative energization to further reduce the likelihood of false operation responsive to a single transient and smooths out the 30-cycle impulse waves so as to hold the relay operated responsive to the ringing signal. The operation of either of relays T and R opens the above traced circuit path through the winding of relay K1 to prevent its operation during the remainder of a ringing interval. If relay T is operated, it closes a circuit for operating relay RT and if relay R is operated, it closes a circuit for operating relay RR. The operation of relay RT disconnects the tip conductor of line 210 from hybrid coil 166 and connects this conductor through ballast lamp 209 and windings 206 and 207 of transformer PT3 to ground, thereby effecting the transmission of ringing current over the tip conductor of line 210 to actuate the ringer 212 of station 211 and the ringers of any other stations which are signaled over the tip conductor of line 210. The operation of relay RR disconnects the ring conductor of line 210 from hybrid coil 166 and connects this conductor through ballast lamp 209 to windings 206 and 207 of transformer PT3 thereby effecting the transmission of ringing current over the ring conductor of line 210 to actuate ringer 214 of station 213 and the ringers of any other stations which are signaled over the ring conductor of line 210. Varistors 172 and 182, individually connected in parallel with the windings of relays RR and RT, are poled to make these relays slow to release and thereby prevent shortening of the ringing interval due to delays in operating relays K2, R and T.

Since the phase of the ringing signal voltages applied to the grids of tube 190 depends upon the phase of the power supply voltage at carrier terminal CE1 and the phase of the voltages applied to the plates of tube 190 depends on the phase of the power supply voltage at carrier terminal CE2, it may be necessary to change the phase of the voltages applied to the plates to correct for any phase shift of the power supply voltages between the carrier terminals. In this case, a phase shifting network consisting of resistors 175 and 185 and condensers 176 and 186 is provided to obtain the required phase relationship, the values of these resistors and condensers depending upon the phase shift required. If the phase relationship is satisfactory without any phase correction, the network is omitted.

When the receiver is removed at the called station to answer the call, a circuit is closed during a silent interval of the ringing code for operating line relay 160, this circuit being traced from direct-current potential supply conductor 204, resistor 162, top winding of relay 160, bottom windings of hybrid coils 165 and 166, left back contacts of relay RT and RR, ring conductor of line 210, through the subscriber's subset, tip conductor of line 210, right back contacts of relays RT and RR, middle windings of hybrid coils 166 and 165, middle winding of relay 160 and through resistor 161 to ground. The lower winding of relay 160 is a normally energized biasing winding. The operation of relay 160 closes a connection between the positive voltage supply conductor 203 and the plates of the oscillator-modulator and amplifier tubes (not shown) of the carrier transmitter CT2. The operation of relay 160 also closes a circuit including resistor 164 for operatively energizing relay B. The operation of relay B closes a circuit including conductor 204 for operatively energizing the winding of relay C. The operation of relay C opens the normally closed short circuit across the left winding of hybrid coil 165, opens the operating circuit of relay K1, opens the connection between conductor 150 and the grids of tube 190, closes the filament circuit for the amplifier tube of the transmitter CT2, and connects ground to conductor 156 to render the oscillator-modulator tube effective to generate and transmit carrier current of frequency F2 at a desired energy level. With relay K1 normal and frequency control crystal 152 operatively connected to the oscillator of carrier transmitter CT2, carrier current of frequency F2 is transmitted through filter FL1, conductors 112, coupler 111 and power line PL to the carrier terminal equipment CE1 and to each of the carrier subscriber stations 215 which are connected to power line PL.

The carrier current of frequency F2 transmitted from carrier terminal equipment CE2 when an incoming call is answered at one of the subscriber stations connected to line 210 does not affect the carrier receiver at carrier subscriber station 215 since this receiver is tuned to a band including frequency F1 but excluding frequencies F2 and F3. Since the receiving filter 101 of carrier receiver CR1*a* at the carrier terminal CE1 is tuned to pass a band including frequency F2, the carrier current of this frequency transmitted from the answering carrier station passes through coupler 110 and receiving filter 101 of carrier receiver CR1*a* of the carrier equipment CE1, to the input circuit of amplifier 102. Rectifier element 106 transmits a part of the output of amplifier 102 to effect the energization of the windings of relays 47 and 41 in series; and rectifier element 105 transmits voice frequency components in the output circuit of amplifier 102 through condenser 49 and windings 31 of hybrid coil HC. The operation of relays 47 and 41 by the rectified carrier current of frequency F2 is delayed for a predetermined interval of time, while condenser 43 is charging to prevent operation of these relays by static or other momentary disturbances on line PL. The operation of relay 41 opens a normally closed short circuit across relay 45 and closes a circuit for operating relay 42. The operation of relay 42 connects the conductors of line 21 to windings 30 of hybrid coil HC; and with relay 47 also operated, these windings are connected in series across the conductors of line 21 to cause the operation of the ringing trip relay (not shown) of the connector C1 and the closing of the talking path through the connector between the calling station 10 and line 21. The aforementioned operation of relay 42 closes a short circuit across resistor 89 to reduce the grid bias of tube 80 and closes a short circuit across resistors 38 and 36 to reduce the grid bias of tube 98 so that carrier current of frequency F1 is transmitted through transformer 99 and coupler 110 over power line PL. The carrier current of frequency F1 thus transmitted over the power line effects the continuous operation of relay K2 of carrier equipment CE2. Voice currents transmitted from the called subscriber station over line 210 through the windings of hybrid coils 165 and 166 modulate the carrier current of frequency F2 transmitted by the carrier transmitter CT2 over the power line PL to the carrier receiver CR1*a* and thence through rectifier 105 and the windings 31 and 30 of hybrid coil HC, through line 21 and the talking connection in the central office to the calling subscriber station 10. Voice currents incoming over line 21 from the calling station 10 are impressed through windings 30 and 32 of hybrid coil HC on a grid of tube 80 thereby to modulate the carrier current of frequency F1 being transmitted over the power line; and these voice current components of the carrier current of frequency F1 incoming to carrier receiver CR2 are transmitted through conductor 150, condenser 151, and windings of hybrid coils 165 and 166 over line 210 to the called subscriber station. Thus two-way voice transmission between station 10 and the called carrier station is effected and the connection is maintained until released at the calling and called stations. When the handset is replaced on the hook at the called carrier subscriber station, relay 160 releases thereby deenergizing carrier transmitter CT2 and releasing relays B and C; but relay K2 of carrier equipment CE2 remains operated until carrier transmitter CT1 of the carrier terminal equipment CE1 is also deenergized. When the transmission of carrier current of frequency F2 from carrier transmitter CT2 ceases, relays 47 and 41 of the carrier terminal equipment CE1 release.

The release of relay 47 opens the bridge across the conductors of line 21 and the release of relay 41 causes the release of relay 42. The release of relay 42 reconnects line 21 to ringing relays 51 and 61, opens the short circuit across biasing resistor 89, and opens the short circuit across biasing resistors 38 and 36 whereby the transmission of carrier current of frequency F1 from transmitter CT1 is ended and relay K2 of carrier equipment CE2 and the corresponding relay at each of the carrier subscriber stations 215 are released. The line-finder LF1 and selector S1 are restored to normal in usual and well-known manner when the receiver is replaced at the calling station 10.

*Call from carrier subscriber station to station 10*

Assume now that the receiver is removed from the receiver hook at one of the subscriber stations connected to line 210 to initiate a call to station 10. Relay 160 is thereby operatively energized, and carrier transmitter CT2 is energized in the manner above described to transmit carrier current of frequency F2 over the power line. This carrier current does not affect carrier subscriber station 215 because the input filter of the carrier receiver thereat is tuned to pass a band which does not include frequency F2. At the carrier terminal equipment CE1, the carrier current of frequency F2 passes through filter 101 of carrier receiver CR1*a* and effects the operation of relays 47 and 41. The operation of relay 41 causes the operation of relay 42; and with both of relays 47 and 42 operated, the windings 30 of hybrid coil HC are connected in series with the conductors of line 21 to cause the operation of the line relay (not shown) of line circuit 22, and a line-finder LF2 is thereupon operated to extend the calling line 21 to a first selector S2. The aforementioned operation of relay 42 also reduced the bias of tubes 80 and 98 in the manner hereinbefore described to cause carrier transmitter CT1 to transmit carrier current of frequency F1 over power line PL. This carrier current is modulated by dial tone transmitted from selector S2 through line-finder LF2, line 21 and windings 30 and 32 of hybrid coil HC to the input circuit of tube 80. The dial tone modulated carrier current of frequency F1 thus transmitted over power line PL and incoming to carrier equipment CE2, is received by carrier receiver CR2; and the dial tone is transmitted through conductor 150, windings of hybrid coils 165 and 166 and line 210 to the calling station. When the calling subscriber hears the dial tone, the directory number of the called station 10 is dialed. The line relay 160 is alternately released and reoperated under the control of the dial and the contacts of relay 160 open and close the connection between plate supply conductor 203 and amplifier-modulator of carrier transmitter CT2 to transmit over the power line a train of dial impulses corresponding to each digit dialed, each dial impulse being transmitted as an interruption of the carrier current of frequency F2. With relay 42 of carrier terminal equipment CE1 operated, condenser 43 is connected in parallel with the winding of relay 41 alone, so that relay 47 becomes fast in operating and releasing and relay 41 becomes slow in releasing; so that relay 41 remains operated during the receipt of dial impulses but relay 47 is released and reoperated responsive to each impulse. Each release of relay 47 opens the bridge across the conductors of line 21. The first train of dial impulses is thus repeated over line 21 to effect the selective operation of selector S2. The connection is extended by the operation of selector S2 to an idle connector C2 having access to the called line. The remaining digits dialed by the calling subscriber effect the selective operation of connector C2 to connect with the called line 11 and to select the ringing code with which station 10 is signaled. The connector C2 makes the usual busy test and if line 11 is idle, the selected ringing code is transmitted over line 11 to signal the called subscriber. When the called subscriber answers, the ringing trip relay (not shown) of connector C2 is operated to terminate the ringing and the talking connection is established between lines 21 and 11. Voice currents transmitted from the calling station over line 210 modulate the carrier current of frequency F2 transmitted over the power line PL from the carrier transmitter CT2; and the carrier receiver CR1*a* of carrier equipment CE1 transmits these voice currents through demodulator 105, condenser 49, windings 31 and 30 of hybrid coil HC, over line 21, through line-finder LF2, selector S2, connector C2 and line 11 to the called station 10. Voice currents from station 10 are transmitted over line 11, through connector C2, selector S2, line-finder LF2, line 21, and windings 30 and 32 of hybrid coil HC to modulate the carrier current of frequency F1 being transmitted from carrier transmitter CT1 over power line PL; and the carrier receiver CR2 at the calling carrier subscriber station demodulates this carrier current and transmits the voice currents through rectifier 147, conductor 150, condenser 151, windings of hybrid coils 165 and 166 and line 210 to the calling station.

The connection is maintained until the receiver is replaced on the receiver hook at the calling station, at which time the line relay 160 releases. The release of relay 160 deenergizes the carrier transmitter CT2, causing the release of relays 47, 41 and 42 of carrier terminal equipment CE1. The release of relay 47 opens the bridge across the conductors of line 21 whereby the connector C2, selector S2 and line-finder LF2 are restored to normal in usual and well-known manner. The release of relay 42 deenergizes the carrier transmitter CT1 to stop the transmission of carrier current of frequency F1 over line PL; and relay K2 of carrier equipment CE2 then releases.

*Reverting calls*

A call from one of the subscriber stations served by central office line 21 to another of the stations served by the same line 21 is known as a reverting call and is initiated in the same manner as any other call. The operation of a carrier subscriber station 215 on a reverting call originated thereat is described in the aforementioned Edson-Hochgraf application. When a reverting call is initiated at one of stations 211 and 213, a line finder LF2 is operated to connect line 21 to an idle selector S2; and the operation of the dial at the calling station effects the operation of the selector and a connector C2 to connect with the called line. The connector C2 is arranged to make a reverting call test in case the called line is found busy when connection is made therewith. A connector arranged to make a reverting call test is disclosed in the patent to H. Hovland, No. 1,849,087 granted March 15, 1932. Busy tone is transmitted from the connector C2 to the calling station and the subscriber thereat thereupon restores the receiver to normal to permit ringing of the called station. When the receiver is restored to normal at the calling station, carrier transmitter CT2 is deenergized and the transmission of carrier current of frequency F2 over line PL is terminated, thereby causing the release of relays 47, 41 and 42 of carrier terminal CE1. The bridge across conductors of line 21 is opened by the release of relay 47 and the connector C2 then makes the revertive busy test above mentioned. Since the call being described is a reverting call, the connector finds that the called central office line 21 is also the calling line; and the line-finder LF2 and selector S2 are thereupon restored to normal. The connector C2 is held, however, with its brushes in engagement with the terminals to which line 21 is connected and ringing current is transmitted according to the selected ringing code over either the tip or the ring conductor of line 21 depending on whether the called station is a tip station or a ring station. The one or the other of ringing relays 51 and 61 is operated by the ringing current to effect the transmission of impulses of carrier current of frequency F1 from carrier transmitter CT1 over the power line PL to actuate the ringers at all of the tip stations served by central office line 21, if the called station is a tip station; or to actuate the ringers at all of the ring stations served by line 21, if the called station is a ring station. If the calling station is not signaled on the same side of the line 21, as is the called station, a short impulse of ringing current is transmitted at the end of each ringing code cycle to effect a short operation of the ringer at the calling station so that the calling party will know, when ringing ceases, that the call has been answered.

Assume first that the called station is the carrier subscriber station 215. When the receiver is removed from the receiver hook at the called station to answer the call, the carrier transmitter at station 215 will be energized to transmit carrier current of frequency F2 over the power line PL, thereby operating relays 47 and 41 of the carrier terminal equipment CE1. Relay 41 operates relay 42 and with relays 47 and 42 both operated, windings 30 of hybrid coil HC are bridged across the conductors of line 21 to effect the operation of the ringing trip relay (not shown) of connector C2. The transmission of ringing current is thereby stopped and the brushes of connector C2 remain in engagement with the terminals of line 21 as long as the bridge is maintained across the conductors of line 21. With relay 42 operated, carrier transmitter CT1 is energized to transmit carrier current of frequency F1, thereby operating the carrier equipment at each carrier subscriber station connected to power line PL as described in the aforementioned Edson-Hochgraf application and also operating relay K2 of carrier terminal equipment CE1 associated with the calling station on line 210. With relay K2 continuously operated, relay K1 is also operatively energized; and relay K1 locks independent of relay C as long as relay K2 remains operated. When the subscriber at the calling station realizes the ringer is no longer being actuated, the receiver is removed for conversation with the subscriber at the called station. Relay 160 is thereby operated, in turn causing the operation of relay B followed by the operation of relay C. With the relay K1 operated, crystal 153 is included in the frequency determining circuit of the oscillator tube of transmitter CT2; and energization of the carrier transmitter by the actuation of relay 160 causes the transmission of carrier current of frequency F3 over the power line PL. The carrier current of frequency F3 thus transmitted over line PL is without effect at any of the carrier subscriber stations; but at the carrier terminal CE1, this current passes through filter 107 of carrier receiver CR1b to amplifier 108. The current in the output circuit of amplifier 108 is demodulated by rectifier 109; and since the short circuit across the winding of relay 45 has been opened by the operation of relay 41 responsive to carrier current of frequency F2 received over line PL from the called carrier subscriber station, relay 45 is operatively energized. Relay 45 closes a circuit for operating relay 44. The operation of relay 44 opens the operating circuit of relay 45 and connects the output of demodulator 109 to windings 31 of hybrid coil HC. Conversation between the calling and called stations is thus enabled, voice currents from the telephone transmitted at the called station being effective to modulate the carrier current of frequency F2 transmitted from the associated carrier transmitter over line PL to carrier receiver CR1a of the carrier terminal CE1. The voice current components of the carrier current of frequency F2 received from the called station are transmitted through demodulator 105, condenser 49 and windings 31 and 32 of hybrid coil HC to modulate the carrier current of frequency F1 transmitted from carrier transmitter CT1 over line PL to both the calling and called carrier subscriber stations. The voice currents from the telephone transmitter at the calling station modulate the carrier current of frequency F3 transmitted from the associated carrier transmitter CT2 over line PL to carrier receiver CR1b of the carrier terminal CT. The voice current components of the carrier current of frequency F3 received from the calling station are transmitted through demodulator 109, windings 31 and 32 of hybrid coil HC to modulate the carrier current of frequency F1 transmitted from carrier transmitter CT1 over line PL to both the calling and called carrier subscriber stations.

If the calling subscriber restores the telephone set to normal at the same time or before the telephone set is restored at the called station, the associated carrier transmitter CT2 is deenergized to terminate the transmission of carrier current of frequency F3, relay 45 of carrier equipment CE1 being thereby released. When the carrier transmitter at the called carrier subscriber station 215 is also deenergized, the transmission of carrier current of frequency F2 is terminated thereby causing the release of relays 47, 41 and 42 of carrier terminal CE1. The release of relay 42 deenergizes carrier transmitter CT1 thereby causing the release of the operated relays at each of the carrier subscriber stations and the release of relays K2 and K1 of equipment CE2. The release of relay 47 opens the bridge across line 21 thereby causing the connector C2 to be restored to normal in usual manner.

If the handset is restored to normal at the called carrier subscriber station 215 before the connection is released at the calling station, the deenergization of the carrier transmitter at the called station causes the release of relays 47 and 41 of carrier terminal CE1. The release of relay 47 opens the bridge across the conductors of line 21 and the release of relay 41 causes the release of relay 42. The release of relay 42 restores the normal grid bias of the carrier transmitter tube to terminate the transmission of carrier current of frequency F1 over line PL and thereby causes the release of the operated relays at each of the carrier subscriber stations and the release of relays K2 and K1 of equipment CE2. The release of relay K1 of the equipment CE2 changes the tuning of carrier transmitter CT2 by inserting crystal 152 in place of crystal 153 in the frequency determining circuit of the oscillator; so that the carrier current transmitted therefrom is changed from frequency F3 to frequency F2. This change in the frequency of the carrier circuit transmitted over line PL from the carrier equipment CE2 causes the release of relays 45 and 44 and the reoperation of relays 47, 41 and 42 of carrier terminal CE1. The reoperation of relays 47 and 42 again closes the bridge across the conductors of line 21. If the interval during which relays 47 and 42 were released is sufficiently long, the connector switch C2 has at that time been restored to normal; and in such a case the reclosing of the bridge effects the operation of the line relay of line 21 and the starting of a line-finder. The reoperation of relay 42 again energizes carrier transmitter CT1 so that carrier current of frequency F1 is again transmitted over line PL, operating relays at all carrier subscriber stations and reoperating relay K2 of carrier equipment CE2. Since the circuit for operating relay K1 is open at a contact of relay C, relay K1 does not reoperate and carrier current of frequency F2 is transmitted until the telephone is replaced at the calling station. When the receiver is restored to normal at the calling station on line 210, relay 160 releases. The release of relay 160 causes the successive release of relays B and C and deenergizes the carrier transmitter CT2 to stop the transmission of carrier current of frequency F2 and thereby effect the release of relays 47, 41 and 42 at the carrier terminal CE1. The release of relay 47 again opens the bridge across the conductors of line 21 thereby to effect the return of connector C2 to normal, if not already returned to normal; or if connector C2 was returned to normal before the carrier transmitter at the calling station started to transmit carrier current of frequency F2, the opening of the bridge across the conductors of line 21 causes the release of the line-finder which was operated to connect with line 21 after the connector C2 was released.

If both the calling and called stations are connected to line 210, the operations of the carrier equipment CE2 are the same as above described, as though a single one of the stations on line 210 were involved on the call. The voice frequency currents are transmitted over that part of line 210 which interconnects the two stations. Another transmission path between these stations includes the carrier frequency equipments CE2 and CE1 and power line PL, in order to maintain the connector C2 in operated position in engagement with the terminals of line 21 until the conversation is terminated. The transmission delay in the carrier path will not be sufficient to produce appreciable distortion of the transmission between the two stations.

What is claimed is:

1. In combination in a power line carrier communication system, an alternating-current power line, a carrier terminal unit connected to a particular phase of said power line, a plurality of telephone stations, a two-conductor voice frequency line connecting said stations to said carrier terminal unit, said carrier terminal unit comprising means for demodulating carrier current incoming over said power line, first control means connected to said demodulating means for operation when carrier current is being received over said power line during half cycles of one polarity of said phase of the power line voltage, second control means connected to said demodulating means for operation when carrier current is being received over said power line during half cycles of the opposite polarity of said phase of the power line voltage, means including transformer means connected to said particular phase of said power line supplying operating potential to said first control means during half cycles of one polarity of said phase of the power line voltage and supplying operating potential to said second control means during half cycles of the opposite polarity of said phase of the power line voltage, a ringing current source, relay means connected to and operated by said first control means for connecting said source to one of the conductors of said voice frequency line to signal some of said stations, and relay means connected to and operated by said second control means for connecting said source to the other of the conductors of said voice frequency line to signal the remainder of said stations.

2. In a telephone system comprising subscriber lines including multistation lines, a first ringing current source, means for selectively connecting said source to the one or the other conductor of a subscriber line to transmit a desired one of a plurality of different ringing codes over the selected line conductor, an alternating-current power line, a first carrier terminal unit connecting one of said multistation lines to said power line, a two-conductor voice frequency line, a plurality of subscriber stations connected to said voice frequency line, a second carrier terminal unit interconnecting said power line and said voice frequency line, transformer means supplying voltage of the same phase from said power line to both of said carrier terminal units, transmitting means in said first unit for transmitting carrier current over said power line to said second unit, a first signal means in said first unit connected for operation by ringing current from said source incoming over one of the conductors of said multistation line, a second signal means in said first unit connected for operation by ringing current from said source incoming over the other conductor of said multistation line, first control means including windings of said transformer means and said first signal means connected to energize said transmitting means to transmit carrier current over said power line during half cycles of one polarity of said phase of the power line voltage when said first signal means is operated by ringing current from said source incoming over said one conductor of the multistation line, second control means including windings of said transformer means and said second signal means connected to energize said transmitting means to transmit carrier current over said power line during half cycles of the other polarity of said phase of the power line voltage when said second signal means is operated by ringing current incoming over said other conductor of the multistation line, demodulating means in said second carrier terminal unit for demodulating carrier current incoming thereto over the power line, a second ringing current source, a first relay means for connecting said second source to one of the conductors of said voice frequency line to signal some of said stations connected thereto, a second relay means for connecting said second source to the other of the conductors of said voice frequency line to signal the remainder of said stations, first control means connected to said demodulating means for operating said first relay means when carrier current is being received over said power line during half cycles of one polarity of said phase of the power line voltage, second control means connected to said demodulating means for operating said second relay means when carrier current is being received over said power line during half cycles of the opposite polarity of said phase of the power line voltage, and means comprising windings of said transformer means supplying operating potential to said first control means during half cycles of one polarity of the power line voltage and supplying operating potential to said second control means during half cycles of the opposite polarity of the power line voltage.

3. In a telephone system comprising subscriber lines including multistation lines, a first ringing current source, means for selectively connecting said source to the one or the other conductor of a subscriber line to transmit ringing current in a desired one of a plurality of different ringing codes over the selected line conductor, an alternating-current power line, a first carrier terminal unit connecting said power line to one of said multistation lines, a two-conductor voice frequency line, a plurality of subscriber stations connected to said voice frequency line, a second carrier terminal unit connecting said power line to said voice frequency line, transformer means supplying voltage of the same phase from said power line to both of said carrier terminal units, carrier current transmitting means in said first unit for transmitting carrier current over said power line to said second unit, first signal means in said first unit connected for operation by ringing current incoming over one conductor of said one line, second signal means in said first unit connected for operation by ringing current incoming over the other conductor of said one line, control means in said first carrier terminal unit including said first and second signal means and windings of said transformer windings connected to energize said transmitting means to transmit carrier current over said power line during half cycles of one polarity of said phase of the power line voltage when said first signal means is operated and to energize said transmitting means to transmit carrier current over said power line during half cycles of the opposite polarity of said phase of the power line voltage when said second signal means is operated, demodulating means in said second carrier terminal unit connected for demodulating carrier current incoming over said power line, a second ringing current source, control means in said second unit comprising two triodes and windings of said transformer means for selectively effecting connection of said second source to the one or the other of the conductors of said voice frequency line, means connected to said demodulating means for applying a positive potential to the control elements of said triodes when carrier current is being received by said demodulating means, the cathodes of said triodes being connected to the midpoint of a secondary winding of said transformer windings and the anodes of said triodes being connected respectively to the opposite ends of said secondary winding whereby one of said triodes is energized by application of said positive potential to its control element during half cycles of one polarity of said phase of the power line voltage and the other of said triodes is energized by application of said positive potential to its control element during half cycles of the opposite polarity of said phase of the power line voltage, means comprising a relay connected in the anode-cathode circuit of one of said triodes for connecting said second source to one conductor of said voice frequency line to signal the station having ringers connected to said one conductor, and means comprising a relay connected in the anode-cathode circuit of the other of said triodes for connecting said second source to the other conductor of said voice frequency line to signal the stations having ringers connected to said other conductor.

4. In a telephone system, a carrier frequency transmission line, a first carrier terminal unit connected to said line, a second carrier terminal unit, remote from said first carrier terminal unit, connected to said line, interconnected power lines and transformer means supplying voltage of the same phase to both carrier terminal units, a two-conductor voice frequency line connected to said second carrier terminal unit, a plurality of subscriber stations connected to said voice frequency line, transmitting means in said first carrier terminal unit for transmitting carrier current over said carrier frequency line, means comprising windings of said transformer means selectively applying an energizing potential to said transmitting means during half cycles of one polarity of said phase of the power line voltage or during half cycles of the opposite polarity of the said phase of the power line voltage, demodulating means in said second carrier terminal unit for demodulating carrier current incoming over said carrier frequency line, a ringing current source, first control means connected to said demodulating means for connecting said source to one of the conductors of said voice frequency line to signal certain of the stations connected thereto when carrier current is received by said demodulating means during half cycles of one polarity of said phase of the power line voltage, second control means connected to said demodulating means for connecting said source to the other of the conductors of said voice frequency line to signal the other of the stations connected thereto when carrier current is received by said demodulating means during half cycles of the opposite polarity of said phase of the power line voltage, and means including windings of said transformer means supplying operating potential to said first control means during half cycles of one polarity of said phase of the power line voltage and supplying operating potential to said second control means during half cycles of the opposite polarity of said phase of the power line voltage, whereby said first control means is operated when carrier current is being received by said demodulating means during half cycles of one polarity of said phase of the power line voltage and said second control means is operated when carrier current is being received by said demodulating means during half cycles of the opposite polarity of said phase of the power line voltage.

ROBERT C. EDSON.

References Cited in the file of this patent

UNITED STATES PATENTS

| Number | Name | Date |
|---|---|---|
| 2,289,048 | Sandalls | July 7, 1942 |
| 2,294,905 | Honaman | Sept. 8, 1942 |
| 2,378,326 | Rees | June 12, 1945 |
| 2,430,471 | Lang | Nov. 11, 1947 |
| 2,440,239 | Almquist | Apr. 27, 1948 |